(12) United States Patent
Canós et al.

(10) Patent No.: US 7,344,696 B2
(45) Date of Patent: Mar. 18, 2008

(54) POROUS CRYSTALLINE MATERIAL (ZEOLITE ITQ-24), PREPARATION METHOD THEREOF AND USE OF SAME IN THE CATALYTIC CONVERSION OF ORGANIC COMPOUNDS

(75) Inventors: Avelino Corma Canós, Valencia (ES); Rafael Castañeda Sánchez, Valencia (ES); Vicente Fornés Seguí, Valencia (ES); Fernando Rey García, Valencia (ES)

(73) Assignees: Consejo Superior de Investigaciones Cientificas, Madrid (ES); Universidad Politecnica de Valencia, Valencia (ES)

( * ) Notice: Subject to any disclaimer, the term of this patent is extended or adjusted under 35 U.S.C. 154(b) by 368 days.

(21) Appl. No.: 11/200,534

(22) Filed: Aug. 9, 2005

(65) Prior Publication Data
US 2006/0036120 A1 Feb. 16, 2006

Related U.S. Application Data

(63) Continuation of application No. PCT/ES2004/070006, filed on Feb. 10, 2004.

(30) Foreign Application Priority Data
Feb. 14, 2003 (ES) ............... 200300445

(51) Int. Cl.
| | |
|---|---|
| C01B 39/46 | (2006.01) |
| C01B 39/48 | (2006.01) |
| B01J 29/06 | (2006.01) |
| B01J 29/064 | (2006.01) |
| B01J 29/068 | (2006.01) |
| B01J 29/70 | (2006.01) |
| B01J 29/72 | (2006.01) |
| B01J 29/74 | (2006.01) |
| B01J 29/76 | (2006.01) |

(52) U.S. Cl. .............. 423/718; 423/702; 423/705; 423/707; 502/61; 502/64; 502/66

(58) Field of Classification Search ............ 423/702, 423/705, 707, 718; 502/61, 64, 66
See application file for complete search history.

(56) References Cited

U.S. PATENT DOCUMENTS

| 4,676,958 | A | 6/1987 | Zones |
| 5,219,813 | A | 6/1993 | Kumar et al. |
| 6,471,940 | B1 | 10/2002 | Kurata et al. |
| 2007/0048214 | A1* | 3/2007 | Zones et al. ............ 423/706 |

FOREIGN PATENT DOCUMENTS

| EP | 0 551 688 A1 | 7/1993 |
| WO | WO03/074422 | 9/2003 |

OTHER PUBLICATIONS

Bhaumik, A. et al, Synthesis of MTW-type microporous material and its vandium-silicate analogue using a new diquaternary ammonium cation as a template, Microporous Materials, 1995, vol. 5, No. 3, pp. 173-178.

(Continued)

*Primary Examiner*—David M Brunsman
(74) *Attorney, Agent, or Firm*—Klauber & Jackson L.L.C.

(57) ABSTRACT

The invention relates to a porous crystalline material (ITQ-24), the preparation method thereof and the use of same in the catalytic conversion of organic compounds. More specifically, the invention relates to a synthetic porous crystalline material which is characterised in that it is formed by tetrahedrally coordinated atoms which are interconnected by means of oxygens. Said material, which comprises a unit cell containing 56 tetrahedrally coordinated atoms, is known as ITQ-24. Moreover, in the calcined anhydrous state, the material has chemical formula $nM_{1/p}XO_2:YO_2$, wherein: X is at least one trivalent element, Y is at least one tetravalent element, n is between 0 and 0.2 and M is at least one charge compensation cation in oxidation state p.

23 Claims, 5 Drawing Sheets

View of the rectilinear channels formed by 12 tetrahedrons of zeolite ITQ-24

OTHER PUBLICATIONS

Mal, N.K. et al, Sn-ZSM-12, Catalysis Letters, 1995, vol. 33, pp. 387-394.

Tuel, A., Synthesis, characterization, and catalytic properties of the new TiZSM-12 zeolite, 1995, vol. 15, pp. 236-242.

Castaneda, R. et al., Synthesis of a New Zeolite Structure ITQ-24, with intersecting 10- and 12-Membered Ring Pores, J.Am.Chem. Soc. 2003, vol. 125, No. 26, pp. 7820-7821.

C.Y. Chen et al, From Borosilcate to Gallo- and Aluminosilicate Zeolites: New Methods for Lattice Substitution via Post-Synthetic Treatment, Chevron Research and Technology Co.

Peng Wu et al, A Novel Titanosilicate with MWW Structure. I. Hydrothermal Synthesis, Elimination of Extraframework Titanium, and Characterizations, J. Phys. Chem. B 2001, 105, pp. 2897-2905 (2001).

A Novel Titanosilicate with MWW Structure: II. Catalytic Properties in the Selective Oxidation of Alkenes, Journal of Catalysis 202, pp. 245-255 (2001).

* cited by examiner

View of the rectilinear channels formed by 12 tetrahedrons of zeolite ITQ-24

View of the sinusoidal channels formed by 12 tetrahedrons of zeolite ITQ-24

View of the channels formed by 10 tetrahedrons of zeolite ITQ-24

Unit cell of zeolite ITQ-24

Structure of the dication hexamethylene-bis(trimethylammonium)

POROUS CRYSTALLINE MATERIAL (ZEOLITE ITQ-24), PREPARATION METHOD THEREOF AND USE OF SAME IN THE CATALYTIC CONVERSION OF ORGANIC COMPOUNDS

RELATED APPLICATIONS

The present application is a Continuation of co-pending PCT Application No. PCT/ES2004/070006, filed Feb. 10, 2004, which in turn, claims priority from Spanish Application Serial No. P200300445, filed Feb. 14, 2003. Applicants claim the benefits of 35 U.S.C. §120 as to the PCT application and priority under 35 U.S.C. §119 as to said Spanish application, and the entire disclosures of both applications are incorporated herein by reference in their entireties.

FIELD OF THE ART

The invention comes within crystalline zeolitic materials and their use in the catalytic conversion of organic compounds.

PRIOR ART

Zeolites are porous crystalline materials which have found important applications as catalysts, adsorbents and ion exchangers. Many of these zeolitic materials have well-defined structures which form channels and cavities in their interior, of uniform size and shape that permit the adsorption of certain molecules, whereas they prevent other molecules of a size too large for diffusing through the pores, from passing into the interior of the crystal. This characteristic confers molecular sieve properties on these materials. These molecular sieves can include Si and other elements of groups IIIA and IVA of the periodic table in their lattice, and/or transition metals such as Ti, V, etc., all of them tetrahedrally coordinated, the tetrahedrons being bound by their vertices via oxygens forming a three-dimensional lattice. In the case of containing elements corresponding to IIIA group tetrahedrally coordinated in lattice positions, the negative charge that is generated is compensated by the presence of cations, such as alkalis or alkaline earths for example, which are sited in the channels and/or cavities of these materials. One type of cation can be totally or partially exchanged for another type of cation by means of ion exchange techniques, thereby being able to vary the properties of a given silicate by selecting the desired cations. In the event of these cations being protons, the resulting materials have a high degree of acidity which confers interesting catalytic properties on them.

The use of organic catalysts as structure directing agents has so far been a highly effective method for obtaining novel zeolitic structures. It has recently been proven that the incorporation of heteroatoms other than silicon can play an important role as structure directors, since they promote the formation of certain secondary construction subunits. So, for example, the incorporation of Ge promotes the formation four-member double rings in the final zeolites, while the incorporation of Be or Zn promotes the appearance of three-member rings in the final materials.

As a consequence of the work done in the field of zeolite synthesis, more than 140 zeolitic structures have so far been described wherein the shape, size and connectivity of their channels and/or cavities vary, conferring on them different adsorption/diffusion properties, and therefore displaying different catalytic properties. It is thus evident that obtaining novel zeolites is an important field of development, since the possibility of having a high number of zeolites means that a selection can be made of the structure best suited to the processes sought to be catalysed.

DESCRIPTION OF THE INVENTION

The present invention relates to a synthetic porous crystalline material characterised in that it is formed by tetrahedrally coordinated atoms bound together by means of oxygens, which comprises a unit cell containing 56 tetrahedrally coordinated atoms, known as ITQ-24, whose chemical formula in the calcined anhydrous state is given by $$M_{1/p}XO_2 : YO_2$$

wherein:

X is at least one trivalent element,

Y is at least one tetravalent element, the value of n is between 0 and 0.2 and M is at least one charge compensation cation in oxidation state p.

which possesses an X-ray diffractogram in the calcined anhydrous state whose most representative reflections appear at the spacings given in table 1:

TABLE 1

| 2θ  | d(±0.5 Å) | 100 $I_0/I_{max}$ |
|---|---|---|
| 7.1400 | 12.4012 | w |
| 7.8650 | 11.2596 | vs |
| 11.0150 | 8.0457 | w |
| 20.2900 | 4.3840 | vw |
| 21.4200 | 4.1552 | vw |
| 22.0450 | 4.0388 | vw |
| 22.7350 | 3.9178 | vw |
| 22.9300 | 3.8849 | vw | wherein the interplanar spacings, d, were calculated in Ångstroms and the relative intensity of the lines is calculated as the percentage with respect to the most intense peak, and are regarded as very strong (vs)=80-100, strong (s)=60-80, medium (m)=40-60, weak (w)=20-40 and very weak (vw) =0-20.

Examples of trivalent elements in the formula given above for ITQ-24 are Al, B, Fe, In, Ga, Cr and mixtures thereof.

Examples of tetravalent elements in the formula given above for ITQ-24 are Si, Ti, Sn; Ge and mixtures thereof.

Examples of compensation cations in the formula given above for ITQ-24 are a proton, $H^+$ precursors such as $NH_4^+$ for example, metallic ions such as alkaline or alkaline earth metals, rare earth cations, and metals of group VIII, and also of group IIA, IIIA, IVA, Va, IB, IIB, IIIB, IVB, VB, VIIB of the periodic table of elements, or mixtures thereof.

From the given values, it can be deduced that the crystalline material ITQ-24 can be synthesised in the absence of added trivalent elements and/or compensation cations.

In a preferred embodiment of ITQ-24, X is selected from among B, Al and combinations thereof, and Y is Si, Ge, Ti and combinations thereof.

The synthetic porous crystalline material, ITQ-24, as prepared prior to calcining, possesses an X-ray diffractogram, whose most representative reflections appear at the spacings given in table 2:

TABLE 2

| 2θ | d(±0.5 Å) | 100 I₀/I_max |
|---|---|---|
| 7.1000 | 12.4709 | vw |
| 7.9400 | 11.1534 | vs |
| 10.5950 | 8.3637 | w |
| 11.0150 | 8.0457 | m |
| 19.4800 | 4.5644 | vw |
| 19.5700 | 4.5436 | vw |
| 20.6050 | 4.3177 | m |
| 21.5450 | 4.1314 | vw |
| 22.1750 | 4.0154 | m |
| 22.6550 | 3.9314 | w |
| 22.8650 | 3.8958 | m |
| 22.9550 | 3.8807 | m |
| 26.9400 | 3.3150 | w |
| 27.0100 | 3.3066 | w |
| 29.2100 | 3.0624 | w | wherein the relative intensity is as defined above.

These diffractograms were obtained with a Philips X'Pert diffractometer equipped with a graphite monochromator and an automatic divergence slit using Kα radiation from copper. The diffraction data was registered by means of steps of 2θ of 0.01° wherein θ is the Bragg angle and with a count time of 10 seconds per step.

It has to be borne in mind that the diffraction data for this sample listed as single lines can consist of overlapping multiples or superpositions of reflections which, under certain conditions, such as differences in crystallographic changes, can appear as resolved or partially resolved lines. In general, the crystallographic changes can include small variations in the parameters of the unit cells and/or changes in the symmetry of the crystal, without any change taking place in the connectivity among the atoms of the structure. These modifications, which also include changes in relative intensities, can also be due to differences in the type and quantity of compensation cations, lattice composition and shape thereof, preferred orientation or the type of thermal and hydrothermal treatment undergone.

The porous crystalline material ITQ-24 to which this invention refers is a single crystalline phase possessing a three-directional system of channels which intersect with each other. In particular, zeolite ITQ-24 possesses a first system of channels defined by 12-member rings of tetrahedrally coordinated atoms with a channel opening of 7.7×5.6 Å, a second system of sinusoidal channels also defined by channel openings formed by 12 tetrahedrally coordinated atoms with a channel opening of 7.2×6.2 Å, and finally a third system of channels with a channel opening of 10 tetrahedrally coordinated atoms with a channel opening of 5.75×4.8 Å. These three systems are interconnected to each other.

The structure of zeolite ITQ-24 can be defined by its unit cell, which is the smallest structural unit displaying all the symmetry elements of the material. Table 3 shows the list of positions of all the tetra-coordinated atoms contained in the unit cell for a particular embodiment of ITQ-24. Each tetra-coordinated atom is bonded to its four neighbours via oxygen bridges. Given that the position of the tetra-coordinated atoms can vary slightly depending on the presence of organic matter or water in its pores, on the chemical composition of the material or any other modification, each position coordinate given in table 3 can be modified by ±0.5 Å without any change taking place in the connectivity of the atoms forming the structure of the zeolite ITQ-24.

TABLE 3

| | Atom coordinates (θ) | | |
|---|---|---|---|
| Site | X | Y | Z |
| T1 | 1.61 | 1.60 | 4.71 |
| T2 | 12.24 | 8.36 | 4.71 |
| T3 | 19.65 | 11.92 | 4.71 |
| T4 | 9.02 | 5.16 | 4.71 |
| T5 | 1.61 | 11.92 | 7.90 |
| T6 | 12.24 | 5.16 | 7.90 |
| T7 | 19.65 | 1.60 | 7.90 |
| T8 | 9.02 | 8.36 | 7.90 |
| T9 | 19.65 | 11.92 | 7.90 |
| T10 | 9.02 | 5.16 | 7.90 |
| T11 | 1.61 | 1.60 | 7.90 |
| T12 | 12.24 | 8.36 | 7.90 |
| T13 | 19.65 | 1.60 | 4.71 |
| T14 | 9.02 | 8.36 | 4.71 |
| T15 | 1.61 | 11.92 | 4.71 |
| T16 | 12.24 | 5.16 | 4.71 |
| T17 | 3.19 | 2.61 | 2.31 |
| T18 | 13.82 | 9.37 | 2.31 |
| T19 | 18.06 | 10.91 | 2.31 |
| T20 | 7.43 | 4.15 | 2.31 |
| T21 | 3.19 | 10.91 | 10.30 |
| T22 | 13.82 | 4.15 | 10.30 |
| T23 | 18.06 | 2.61 | 10.30 |
| T24 | 7.43 | 9.37 | 10.30 |
| T25 | 18.06 | 10.91 | 10.30 |
| T26 | 7.43 | 4.15 | 10.30 |
| T27 | 3.19 | 2.61 | 10.30 |
| T28 | 13.82 | 9.37 | 10.30 |
| T29 | 18.06 | 2.61 | 2.31 |
| T30 | 7.43 | 9.37 | 2.31 |
| T31 | 3.19 | 10.91 | 2.31 |
| T32 | 13.82 | 4.15 | 2.31 |
| T33 | 16.63 | 8.26 | 1.61 |
| T34 | 6.00 | 1.50 | 1.61 |
| T35 | 4.63 | 5.27 | 1.61 |
| T36 | 15.26 | 12.03 | 1.61 |
| T37 | 16.63 | 5.27 | 11.00 |
| T38 | 6.00 | 12.03 | 11.00 |
| T39 | 4.63 | 8.26 | 11.00 |
| T40 | 15.26 | 1.50 | 11.00 |
| T41 | 4.63 | 5.27 | 11.00 |
| T42 | 15.26 | 12.03 | 11.00 |
| T43 | 16.63 | 8.26 | 11.00 |
| T44 | 6.00 | 1.50 | 11.00 |
| T45 | 4.63 | 8.26 | 1.61 |
| T46 | 15.26 | 1.50 | 1.61 |
| T47 | 16.63 | 5.27 | 1.61 |
| T48 | 6.00 | 12.03 | 1.61 |
| T49 | 1.62 | 1.54 | 0.00 |
| T50 | 12.25 | 8.30 | 0.00 |
| T51 | 19.63 | 11.98 | 0.00 |
| T52 | 9.01 | 5.22 | 0.00 |
| T53 | 1.62 | 11.98 | 0.00 |
| T54 | 12.25 | 5.22 | 0.00 |
| T55 | 19.63 | 1.54 | 0.00 |
| T56 | 9.01 | 8.30 | 0.00 |

A second object of the present invention is a process for synthesising a crystalline material ITQ-24, which comprises at least:

a first stage wherein a synthesis mixture comprising at least the following:

H₂O, a source of at least one tetravalent element, Y, a structure directing agent (R), and a source of hydroxide ions M', is made to react, a second stage comprising keeping the synthesis mixture at a temperature of between 80 and 200° C. until crystals of said crystalline material form; and a third stage comprising recovering said crystalline material.

In certain cases, the source of hydroxide ions can be the structure directing agent itself.

The synthesis process can furthermore comprise
a fourth stage wherein organic matter occluded in the interior of the crystalline material is eliminated by means of a treatment selected from among extraction treatments, thermal treatments at temperatures above 250° C. for a period of time between 2 minutes and 25 hours, and combinations thereof.

According to a preferred embodiment of the process, the synthesis mixture can furthermore comprise a source of the trivalent element X.

According to a preferred embodiment of the invention, the source of the tetravalent element Y is an oxide, the source of the trivalent element X is an oxide, and the synthesis mixture has a composition, in terms of molar ratios of oxides, of $YO_2/X_2O_3 \geq 5$ $H_2O/YO_2$=between 1 and 50

$R/YO_2$=between 0.05 and 3.0

$OH/YO_2$=between 0.05 and 6.0

$M'_{2/j}O/X_2O_3$=between 0 and 1.0 wherein j is the oxidation state of the cation M' and can be one or two.

According to a more preferred embodiment of the invention, the source of the tetravalent element Y is an oxide, the source of the trivalent element X is an oxide, and the synthesis mixture has a composition, in terms of molar ratios of oxides, of $YO_2/X_2O_3 \geq 7$ $H_2O/YO_2$=between 2 and 20

$R/YO_2$=between 0.05 and 1.0

$OH/YO_2$=between 0.1 and 2.0

$M'_{2/j}O/X_2O_3$=between 0 and 1.0 wherein j is the oxidation state of the cation M' and can be one or two.

According to the process of the present invention, the hydroxide source M' can be selected from among a source of at least a compensation cation M, the anion of the structure directing agent and a mixture of the two.

A preferred example of structure directing agent is a salt of the dication hexamethylene-bis(trimethylammonium).

An additional preferred example of structure directing agent is a salt of the dihydroxide of hexamethylene-bis(trimethylammonium).

A preferred source of the tetravalent element Y is an oxide.

A preferred source of the trivalent element X is an oxide.

A preferred source of the compensation cation M is a hydroxide or an oxide.

According to a particular embodiment of the process, fluoride ions are added to the synthesis mixture in a molar ratio F $-/YO_2$ equal to or less than 0.02. For example, in a particular embodiment, ammonium fluoride can be added in a molar ratio F—/$SiO_2$ less than 0.01, in the case in which Y is Si.

The zeolite ITQ-24 can essentially be prepared as a pure phase or with very small amounts of impurities which can even be undetectable by X-ray diffraction.

In the synthesis process of ITQ-24, hydroxide ions can be used as mobilising agents of the trivalent and tetravalent element oxides, which are introduced in the synthesis means as the hydroxide of an organic cation, inorganic cation or mixtures thereof, being able to be occluded in the interior of the organic species structure, which can be eliminated by conventional means. So, the organic component can be eliminated by, for example, extraction, or by thermal treatment by heating to a temperature of above 250° C. for a period of time between 2 minutes and 25 hours.

The compensation cations in the material in its uncalcined form, or following thermal treatment, can, if present, be exchanged for other cations such as metallic ions, $H^+$ and $H^+$ precursors such as $NH_4^+$. Among the cations that can be introduced by ion exchange, those which can play a positive role in the activity of the material as a catalyst are preferred, and more specifically, cations such as $H^+$, cations of rare earths and metals of group VIII, as well as of group IIA, IIIA, IVA, Va, IB, IIB, IIIB, IVB, VB, VIIB of the periodic table of elements are preferred.

The crystallisation of ITQ-24 can be carried out statically or with stirring, in autoclaves at a temperature between 80 and 200° C., at a sufficient length of time for achieving the crystallisation, for example between 12 hours and 60 days.

It must be borne in mind that the components of the synthesis mixture can come from different sources, and depending on them the crystallisation' times and conditions can vary. With the aim of facilitating the synthesis, crystals of ITQ-24 can be added as seeds to the synthesis mixture, in amounts of up to 15% by weight with respect to the total components constituting the source of the elements X, Y and M. These can be added to the synthesis mixture in advance, during the first stage of the process, or during the crystallisation of ITQ-24, in other words, during the second stage of the process.

In order to facilitate the synthesis, fluoride ions can also be added, in the form of, for example, ammonium fluoride, in F–/$SiO_2$ ratios of less than 0.01.

On completion of the crystallisation stage, the crystals of ITQ-24 are separated from the mother liquor and recovered.

According to a particular embodiment, the ITQ-24 material containing Al can also be prepared starting from the form containing boron using well-known post-synthesis methods (Chen et al., Studies in Surface Science and Catalysis (2001), 135, 1710-1717), such as for example the exchange in the aqueous phase of the material with boron for a source of aluminium ions among which preference is given to nitrate, chloride or halide in general, sulphate, carbonate, citrate, oxide and hydroxide. Also, the zeolite B-Ti-ITQ-24 can be converted into the Ti-ITQ-24 analogue by means of post-synthesis treatments permitting the selective elimination of atoms of B from the zeolite lattice using processs similar to those described previously in the literature (Tatsumi et al., J., Phys. Chem., B., 105, 2897 (2001), J. Catal, 202, 245 (2000) and PCT WO2003/074422).

A third object of the present invention refers to a method for converting a feed formed from at least one organic compound consisting of placing the feed in contact with a catalytically active quantity of the crystalline material known as ITQ-24.

An additional object of the present invention is a method for converting a feed formed from at least one organic compound consisting of placing the feed in contact with a catalytically active quantity of the crystalline material obtained in accordance with the process described above.

With the aim of preparing catalysts, the crystalline material of the present invention can also be intimately combined with hydrogenating-deoxygenating components such as platinum, palladium, nickel, rhenium, cobalt, tungsten, molybdenum, chromium, vanadium, manganese, iron and mixtures thereof. The introduction of these elements can be carried out in the crystallisation stage, by exchange (if appropriate), and/or by impregnation or physical mixing. These elements can be introduced in their cationic form and/or starting from salts or other compounds which, by decomposition, generate the metallic compound or oxide in its suitable catalytic form.

The zeolite ITQ-24 produced by means of this invention can, when it contains trivalent elements in its composition, and once pelletised, be used as a component of catalysts in acid catalytic cracking processes, such as for example processes of catalytic cracking of hydrocarbons, catalytic hydro-cracking of hydrocarbons, reforming of hydrocarbons, alkylation of aromatics with olefins and in processes of esterification, acylation, aniline reaction with formaldehyde in its acid form and/or exchanged with suitable cations.

Likewise, when it contains tetravalent elements in its composition, such as Ti and/or Sn, zeolite ITQ-24 can be used as a heterogeneous catalyst in oxidation processes of olefins with organic or inorganic peroxides in reactions of the Bayer-Villiger type or Meerwein-Pondorf type, among others.

Figure 1:
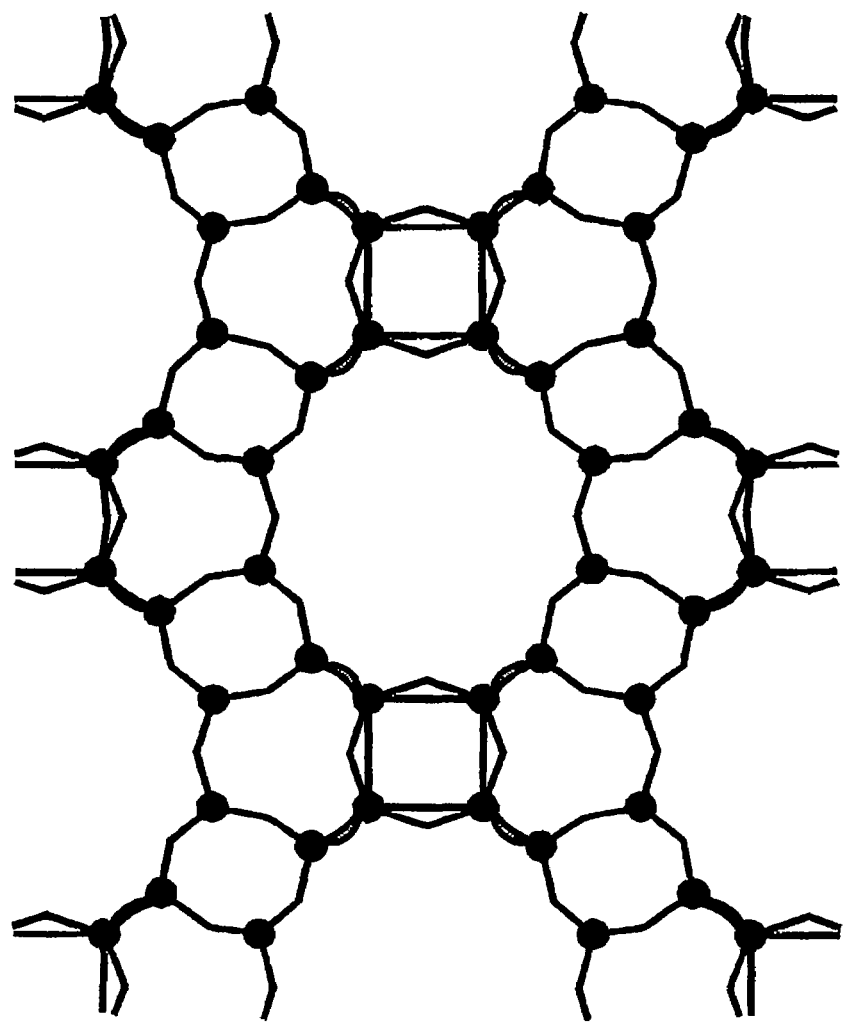
FIG. 1 shows the projection of a first system of channels defined by 12-member rings of tetrahedrally coordinated atoms with a channel opening of 7.7×5.6 Å.
Figure 2:
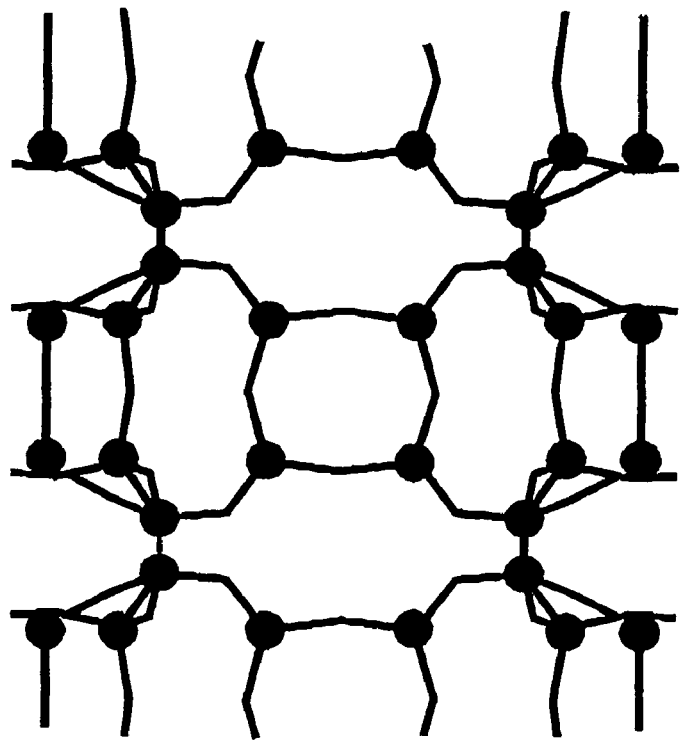
FIG. 2 shows a second system of sinusoidal channels also defined by channel openings formed by 12 tetrahedrally coordinated atoms with a channel opening of 7.2×6.2 Å.
Figure 3:
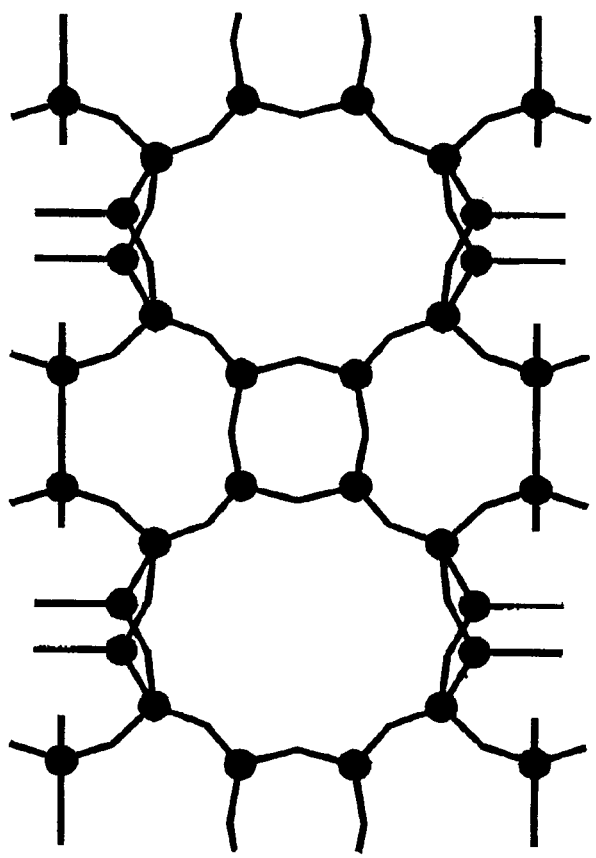
FIG. 3 shows a third system of channels with a channel opening of 10 tetrahedrally coordinated atoms with a channel opening of 5.75×4.8 Å.
Figure 4:
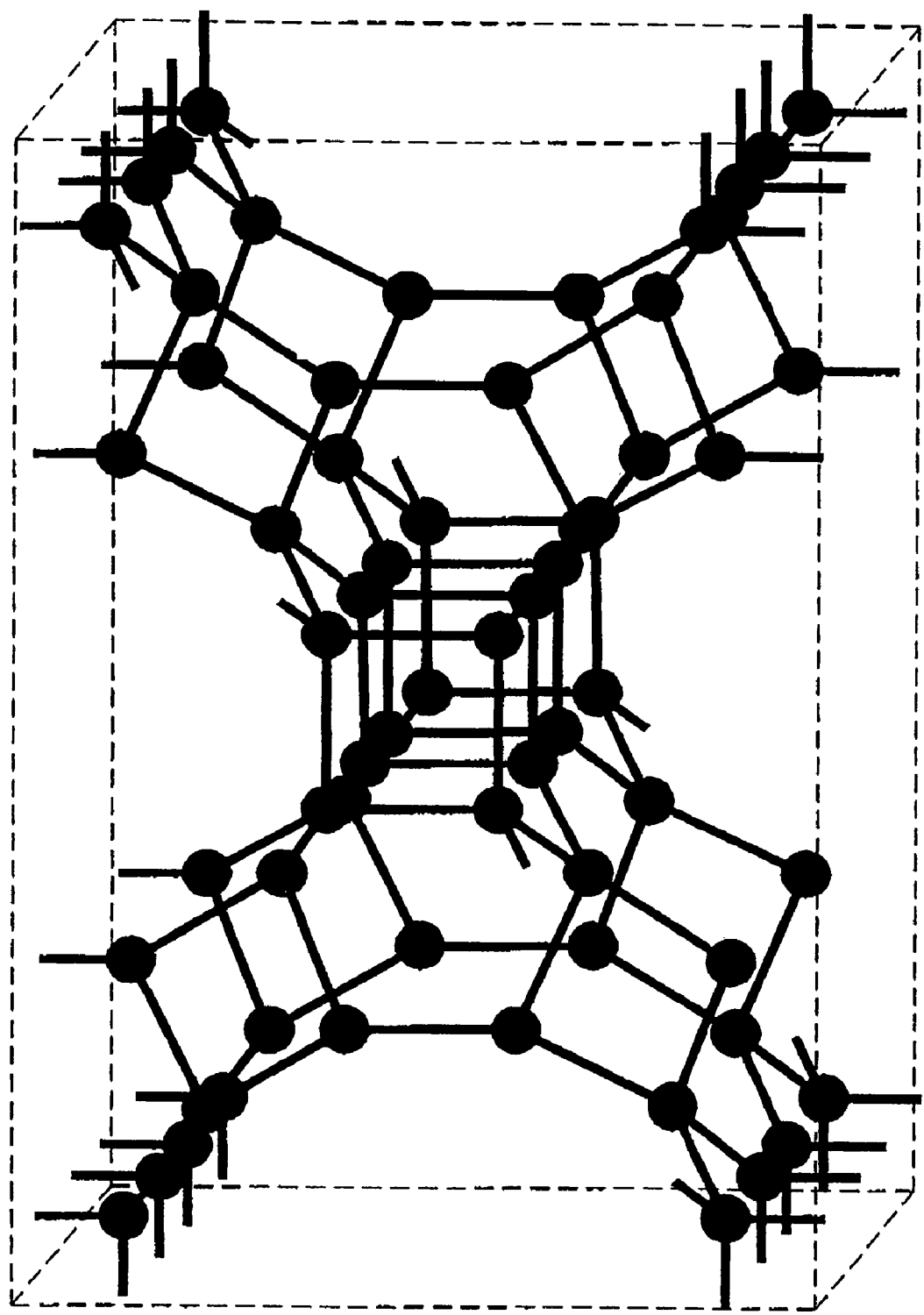
FIG. 4 shows the unit cell of ITQ-24.
Figure 5:
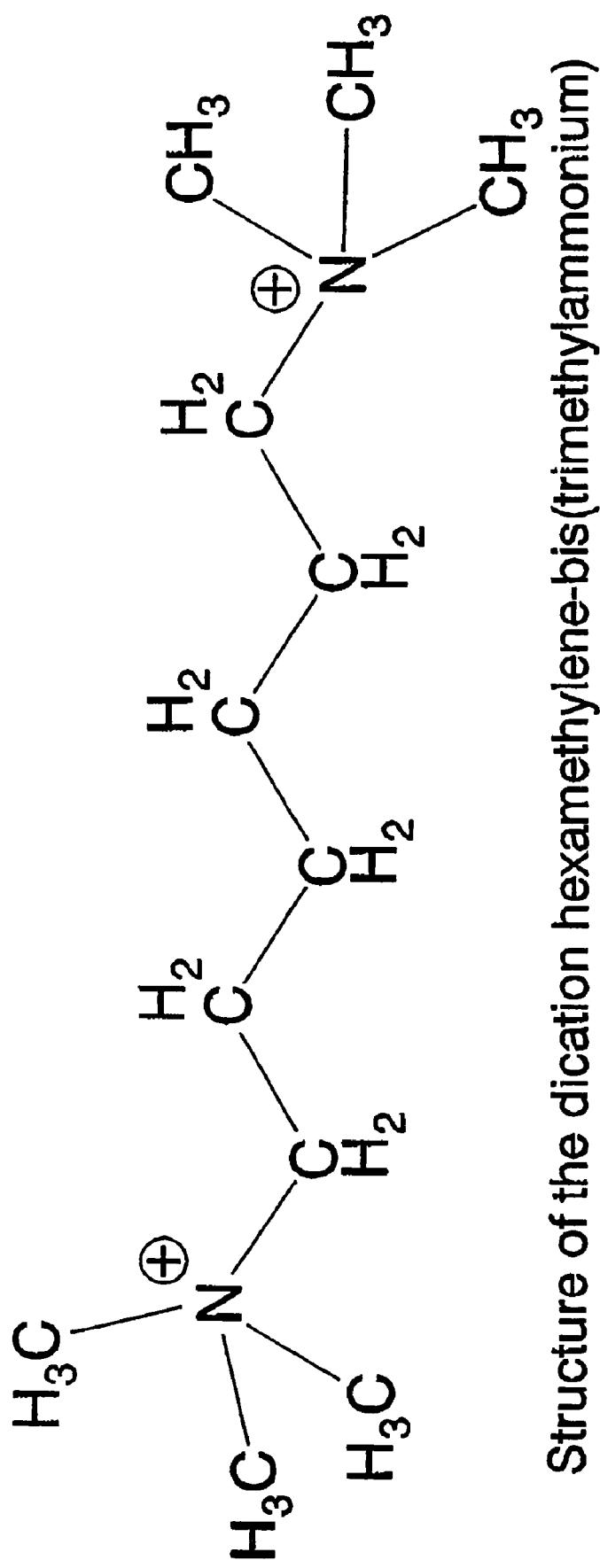
FIG. 5 shows the structure of the dication hexamethylene-bis(trimethylammonium).

In order to illustrate the nature of the invention and the manner of preparing and using it, the following examples are presented:

EXAMPLES

Example 1

Preparation of hexamethylene-bis(trimethylammonium)bromide 37.38 g of 1,6-dibromohexane (purity=96%) and 82.35 g of trimethylamine solution (31-35% by weight in ethanol) are added to a 500 ml flask, and the necessary ethanol is immediately added for obtaining a suitable mixture of the different products that have been added while they are homogenised by magnetic stirring. The resulting mixture is kept at room temperature with constant stirring for 48 hours, and the solid that is formed is recovered by means of filtration and is thoroughly washed with ethyl acetate and diethyl ether. The white solid obtained is dried at room temperature for 12 hours.

Example 2

Preparation of hexamethylene-bis(trimethylammonium)dihydroxide

Hexamethonium dihydroxide is prepared by direct anion exchange, using a resin, Amberlite IRN-78 (Supelco), as a source of hydroxide anions, having previously washed the resin with distilled water up to pH=7. The process consists of dissolving 9 g of hexamethonium dibromide obtained according to example 1 in 250 g of Milli Q water (Millipore). The resulting solution is made to pass through an Amberlite IRN-78 washed resin column, with the flow velocity being adjusted in order to achieve an exchange level greater than 95%. The resulting solution of hexamethylene-bis(trimethylammonium)dihydroxide is collected in a precipitates jar. This solution is concentrated at 50° C. and vacuum until reaching a concentration of hexamethylene-bis(trimethylammonium)dihydroxide of approximately 0.5 mol/kg.

Example 3

Synthesis of the Material ITQ-24 with Aluminium 1.46 g of GeO$_2$ are dissolved in 42.0 g of a solution of hexamethylene-bis(trimethylammonium)dihydroxide with a concentration of 0.499 mols/kg. In the solution obtained, 14.54 g of tetraethylorthosilicate and 0.856 g of aluminium triisopropoxide are hydrolysed, and it is kept stirring allowing all the ethanol and isopropoxide formed in the hydrolysis to evaporate until the reaction mixture reaches a final composition:

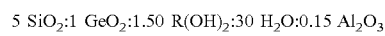

5 SiO$_2$:1 GeO$_2$:1.50 R(OH)$_2$:30 H$_2$O:0.15 Al$_2$O$_3$ wherein R(OH$_2$) is of hexamethylene-bis(trimethylammonium)dihydroxide.

The gel is heated at 175° C. with stirring for 15 days in steel autoclaves with an internal Teflon lining. The solid obtained after filtering, washing with distilled water and drying at 100° C. is ITQ-24 and whose list of diffraction peaks is included in table 4.

TABLE 4

| 2• | d Å | 100 I$_0$/I$_{max}$ |
|---|---|---|
| 7.1000 | 12.4709 | 9 |
| 7.9400 | 11.1534 | 100 |
| 10.5950 | 8.3637 | 17 |
| 11.0150 | 8.0457 | 41 |
| 16.4350 | 5.4026 | 6 |
| 19.4800 | 4.5644 | 13 |
| 19.5700 | 4.5436 | 16 |
| 20.1450 | 4.4152 | 7 |
| 20.6050 | 4.3177 | 54 |
| 21.5450 | 4.1314 | 17 |
| 22.1750 | 4.0154 | 50 |
| 22.6550 | 3.9314 | 24 |
| 22.8650 | 3.8958 | 56 |
| 22.9550 | 3.8807 | 49 |
| 25.1600 | 3.5454 | 6 |
| 25.3350 | 3.5213 | 10 |
| 26.3500 | 3.3879 | 6 |
| 26.9400 | 3.3150 | 22 |
| 27.0100 | 3.3066 | 19 |
| 28.4350 | 3.1441 | 7 |
| 28.8050 | 3.1045 | 7 |
| 29.2100 | 3.0624 | 22 |
| 30.4950 | 2.9362 | 8 |
| 32.0750 | 2.7951 | 8 |

TABLE 4-continued

| 2• | d Å | 100 I$_0$/I$_{max}$ |
|---|---|---|
| 32.2100 | 2.7837 | 6 |
| 32.7300 | 2.7407 | 6 |
| 33.2450 | 2.6994 | 8 |
| 35.6600 | 2.5219 | 6 |
| 37.3550 | 2.4113 | 11 |

The material is calcined following the heating ramp described below. The temperature is increased from 25° C. to 300° C. with a speed of 1° C./min, maintaining the temperature for 3 hours, and then finally raising the temperature up to 580° C. at a speed of 1° C./min, with the temperature being maintained for an additional three hours.

The calcined sample displays a diffraction diagram characteristic of ITQ-24, whose list of peaks is shown in table 5.

TABLE 5

| 2• | d(±0.5 Å) | 100 I$_0$/I$_{max}$ |
|---|---|---|
| 7.1400 | 12.4012 | 15 |
| 7.8650 | 11.2596 | 100 |
| 8.4300 | 10.5062 | 6 |
| 10.5800 | 8.3755 | 3 |
| 11.0150 | 8.0457 | 24 |
| 13.2300 | 6.7032 | 2 |
| 14.2200 | 6.2387 | 2 |
| 16.4850 | 5.3863 | 3 |
| 16.8100 | 5.2829 | 2 |
| 20.2900 | 4.3840 | 6 |
| 21.4200 | 4.1552 | 2 |
| 22.0450 | 4.0388 | 8 |
| 22.7350 | 3.9178 | 4 |
| 22.9300 | 3.8849 | 7 |

Example 4

Synthesis of the Material ITQ-24 with Aluminium 1.115 g of GeO$_2$ are dissolved in 125 g of a solution of hexamethylene-bis(trimethylammonium)dihydroxide with a concentration of 0.128 mols/kg. In the solution obtained, 11.10 g of tetraethylorthosilicate and 0.435 g of aluminium triisopropoxide are hydrolysed, and it is kept stirring allowing all the ethanol and isopropanol formed in the hydrolysis to evaporate until the reaction mixture reaches a final composition:

5 SiO$_2$:1 GeO$_2$:1.50 R(OH)$_2$:30 H$_2$O:0.10 Al$_2$O$_3$ wherein R(OH$_2$) is of hexamethylene-bis(trimethylammonium)dihydroxide.

The gel is heated at 175° C. with stirring for 15 days in steel autoclaves with an internal Teflon lining. The solid obtained after filtering, washing with distilled water and drying at 100° C. is ITQ-24.

The material is calcined following the heating ramp described below. The temperature is increased from 25° C. to 300° C. with a speed of 1° C./min, maintaining the temperature for 3 hours, and then finally raising the temperature up to 580° C. at a speed of 1° C./min, with the temperature being maintained for an additional three hours.

The calcined sample displays a diffraction diagram characteristic of ITQ-24.

Example 5

Synthesis of the Material ITQ-24 with Boron 1.13 g of GeO$_2$ are dissolved in 42.0 g of a solution of hexamethylene-bis(trimethylammonium)dihydroxide with a concentration of 0.1505 mol/kg. In the solution obtained, 11.28 g of tetraethylorthosilicate and 0.160 g of boric acid are hydrolysed, and it is kept stirring allowing all the ethanol formed in the hydrolysis to evaporate until the reaction mixture reaches a final composition:

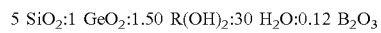

5 SiO$_2$:1 GeO$_2$:1.50 R(OH)$_2$:30 H$_2$O:0.12 B$_2$O$_3$ wherein R(OH)$_2$ is of hexamethylene-bis(trimethylammonium)dihydroxide.

The gel is heated at 175° C. with stirring for 15 days in steel autoclaves with an internal Teflon lining. The solid obtained after filtering, washing with distilled water and drying at 100° C. is ITQ-24.

The material is calcined following the heating ramp described below. The temperature is increased from 25° C. to 300° C. with a speed of 3° C./min, maintaining the temperature for 3 hours, and then finally raising the temperature up to 580° C. at a speed of 3° C./min, with the temperature being maintained for an additional three hours.

The calcined sample displays a diffraction diagram characteristic of ITQ-24.

Example 6

Synthesis of the Material ITQ-24 Containing Titanium 1.177g of GeO$_2$ are dissolved in 56.0 g of a solution of hexamethylene-bis(trimethylammonium)dihydroxide with a concentration of 0.301 mol/kg. In the solution obtained, 11.72 g of tetraethylorthosilicate, 0.154 g of titanium tetraoxide and 0.167 g of boric acid are hydrolysed, and it is kept stirring allowing all the ethanol formed in the hydrolysis to evaporate until the reaction mixture reaches a final composition:

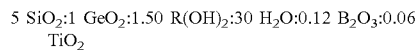

5 SiO$_2$:1 GeO$_2$:1.50 R(OH)$_2$:30 H$_2$O:0.12 B$_2$O$_3$:0.06 TiO$_2$ wherein R(OH)$_2$ is hexamethylene-bis(trimethylammonium)dihydroxide.

The gel is heated at 175° C. with stirring for 30 days in steel autoclaves with an internal Teflon lining. The solid obtained after filtering, washing with distilled water and drying at 100° C. is ITQ-24.

The material is calcined following the heating ramp described below. The temperature is increased from 25° C. to 300° C. with a speed of 1° C./min, maintaining the temperature for 3 hours, and then finally raising the temperature up to 580° C. at a speed of 1° C./min, with the temperature being maintained for additional three hours.

The calcined sample displays a diffraction diagram characteristic of ITQ-24.

Example 7

Post-Synthesis Treatment of a Zeolite ITQ-24 Containing Ti in its Composition A gram of zeolite prepared as described in example 6 is suspended in 30 ml of a 2 M solution of nitric acid at 90° C. for 16 hours. The solid is recovered by filtration and washed with distilled water up to neutrality and absence of chloride ions in the wash water, and is dried at 80° C. for 12 hours. The resulting solid displays diffraction peaks characteristic of zeolite ITQ-24 and the content in B lies below the detection level of the usual analysis techniques. Also, this solid presents a band in the ultraviolet-visible spectrum at around 210 nm, which is assigned to the presence of Ti incorporated into the zeolite lattice.

The invention claimed is:

1. A synthetic porous crystalline material formed by tetrahedrally coordinated atoms which are interconnected by means of oxygens, which presents a unit cell containing 56 tetrahedrally coordinated atoms, known as ITQ-24, whose chemical formula in the calcined anhydrous state is given by

$$nM_{1/p}XO_2:YO_2$$

wherein:

X is at least one trivalent element,
Y is at least one tetravalent element,
the value of n is between 0 and 0.2 and M is at least one charge compensation cation in oxidation state p.
which possesses an X-ray diffractogram in the calcined anhydrous state whose most representative reflections appear at the spacings given in table 1:

TABLE 1

| 2θ | d(±0.5 Å) | 100 $I_0/I_{max}$ |
|---|---|---|
| 7.1400 | 12.4012 | w |
| 7.8650 | 11.2596 | vs |
| 11.0150 | 8.0457 | w |
| 20.2900 | 4.3840 | vw |
| 21.4200 | 4.1552 | vw |
| 22.0450 | 4.0388 | vw |
| 22.7350 | 3.9178 | vw |
| 22.9300 | 3.8849 | vw. | wherein the relative intensity of the lines is calculated as the percentage with respect to the most intense peak, and where (vs)=80-100 signifies very strong, (s)=60-80 strong, (m)=40-60 medium, (w)=20-40 weak and (vw)=0-20 very weak.

2. A synthetic porous crystalline material according to claim 1, that, as prepared prior to calcining, it possesses an X-ray diffractogram, whose most representative reflections appear at the spacings given in table 2:

TABLE 2

| 2θ | d(±0.5 Å) | 100 $I_0/I_{max}$ |
|---|---|---|
| 7.1000 | 12.4709 | vw |
| 7.9400 | 11.1534 | vs |
| 10.5950 | 8.3637 | w |
| 11.0150 | 8.0457 | m |
| 19.4800 | 4.5644 | vw |
| 19.5700 | 4.5436 | vw |
| 20.6050 | 4.3177 | m |
| 21.5450 | 4.1314 | vw |
| 22.1750 | 4.0154 | m |
| 22.6550 | 3.9314 | w |

TABLE 2-continued

| 2θ | d(±0.5 Å) | 100 $I_0/I_{max}$ |
|---|---|---|
| 22.8650 | 3.8958 | m |
| 22.9550 | 3.8807 | m |
| 26.9400 | 3.3150 | w |
| 27.0100 | 3.3066 | w |
| 29.2100 | 3.0624 | w. | wherein the relative intensity of the lines is calculated as the percentage with respect to the most intense peak, and where (vs)=80-100 signifies very strong, (s)=60-80 strong, (m)=40-60 medium, (w)=20-40 weak and (vw)=0-20 very weak.

3. A synthetic porous crystalline material according to claim 1, wherein Y is a tetravalent element selected from among Si, Ge, Ti, Sn; and mixtures thereof.

4. A synthetic porous crystalline material according to claim 1, wherein X is a trivalent element selected from among Al, B, Fe, In, Ga, Cr and mixtures thereof.

5. A synthetic porous crystalline material according to claim 1, wherein X is selected from among B, Al and combinations thereof, and Y is selected from among Si, Ti and combinations thereof.

6. A synthetic porous crystalline material according to claim 1, which has atom coordinates shown below

TABLE 3

| | Atom coordinates (•) | | |
|---|---|---|---|
| Site | X | Y | Z |
| T1 | 1.61 | 1.60 | 4.71 |
| T2 | 12.24 | 8.36 | 4.71 |
| T3 | 19.65 | 11.92 | 4.71 |
| T4 | 9.02 | 5.16 | 4.71 |
| T5 | 1.61 | 11.92 | 7.90 |
| T6 | 12.24 | 5.16 | 7.90 |
| T7 | 19.65 | 1.60 | 7.90 |
| T8 | 9.02 | 8.36 | 7.90 |
| T9 | 19.65 | 11.92 | 7.90 |
| T10 | 9.02 | 5.16 | 7.90 |
| T11 | 1.61 | 1.60 | 7.90 |
| T12 | 12.24 | 8.36 | 7.90 |
| T13 | 19.65 | 1.60 | 4.71 |
| T14 | 9.02 | 8.36 | 4.71 |
| T15 | 1.61 | 11.92 | 4.71 |
| T16 | 12.24 | 5.16 | 4.71 |
| T17 | 3.19 | 2.61 | 2.31 |
| T18 | 13.82 | 9.37 | 2.31 |
| T19 | 18.06 | 10.91 | 2.31 |
| T20 | 7.43 | 4.15 | 2.31 |
| T21 | 3.19 | 10.91 | 10.30 |
| T22 | 13.82 | 4.15 | 10.30 |
| T23 | 18.06 | 2.61 | 10.30 |
| T24 | 7.43 | 9.37 | 10.30 |
| T25 | 18.06 | 10.91 | 10.30 |
| T26 | 7.43 | 4.15 | 10.30 |
| T27 | 3.19 | 2.61 | 10.30 |
| T28 | 13.82 | 9.37 | 10.30 |
| T29 | 18.06 | 2.61 | 2.31 |
| T30 | 7.43 | 9.37 | 2.31 |
| T31 | 3.19 | 10.91 | 2.31 |
| T32 | 13.82 | 4.15 | 2.31 |
| T33 | 16.63 | 8.26 | 1.61 |
| T34 | 6.00 | 1.50 | 1.61 |
| T35 | 4.63 | 5.27 | 1.61 |
| T36 | 15.26 | 12.03 | 1.61 |
| T37 | 16.63 | 5.27 | 11.00 |
| T38 | 6.00 | 12.03 | 11.00 |
| T39 | 4.63 | 8.26 | 11.00 |
| T40 | 15.26 | 1.50 | 11.00 |
| T41 | 4.63 | 5.27 | 11.00 |

TABLE 3-continued

| Site | Atom coordinates (•) | | |
|------|------|------|------|
|      | X    | Y    | Z    |
| T42  | 15.26 | 12.03 | 11.00 |
| T43  | 16.63 | 8.26  | 11.00 |
| T44  | 6.00  | 1.50  | 11.00 |
| T45  | 4.63  | 8.26  | 1.61  |
| T46  | 15.26 | 1.50  | 1.61  |
| T47  | 16.63 | 5.27  | 1.61  |
| T48  | 6.00  | 12.03 | 1.61  |
| T49  | 1.62  | 1.54  | 0.00  |
| T50  | 12.25 | 8.30  | 0.00  |
| T51  | 19.63 | 11.98 | 0.00  |
| T52  | 9.01  | 5.22  | 0.00  |
| T53  | 1.62  | 11.98 | 0.00  |
| T54  | 12.25 | 5.22  | 0.00  |
| T55  | 19.63 | 1.54  | 0.00  |
| T56  | 9.01  | 8.30  | 0.00. | being able to be modified by ±0.5 Å without any change taking place in the connectivity of the atoms forming the structure.

7. A process for synthesising the crystalline material of claim 1, comprising at least:
a first stage wherein a synthesis mixture comprising at least the following:
$H_2O$,
a source of at least one tetravalent element, Y,
a structure directing agent (R), and
a source of hydroxide ions M', is made to react
a second stage comprising keeping the synthesis mixture at a temperature of between 80 and 200° C. until crystals of said crystalline material form; and
a third stage comprising recovering said crystalline material.

8. A process according to claim 7, comprising at least:
a first stage wherein a synthesis mixture consisting of at least the following:
a source of at least one trivalent element X,
$H_2O$,
a source of at least one tetravalent element, Y,
a structure directing agent (R), and
a source of hydroxide ions M', is made to react,
a second stage comprising keeping the synthesis mixture at a temperature of between 80 and 200° C. until crystals of said crystalline material form; and
a third stage comprising recovering said crystalline material.

9. A process according to claim 8, wherein the source of the tetravalent element Y is an oxide, the source of the trivalent element X is an oxide, and the synthesis mixture has a composition, in terms of molar ratios of oxides, of $YO_2/X_2O_3 \geq 5$ $H_2O/YO_2$=between 1 and 50

$R/YO_2$=between 0.05 and 3.0

$OH/YO_2$=between 0.05 and 6.0

$M'_{2/j}O/X_2O_3$=between 0 and 1.0 wherein j is the oxidation state of the cation M' and can be one or two.

10. A process according to claim 8, wherein the source of the tetravalent element Y is an oxide, the source of the trivalent element X is an oxide, and the synthesis mixture has a composition, in terms of molar ratios of oxides, of $YO_2/X_2O_3 > 7$ $H_2O/YO_2$=between 2 and 20

$R/YO_2$=between 0.05 and 1.0

$OH/YO_2$=between 0.1 and 2.0

$M'_{2/j}O/X_2O_3$=between 0 and 1.0 wherein j is the oxidation state of the cation M' and can be one or two.

11. A process according to claim 7, furthermore comprising a fourth stage wherein organic matter occluded in the interior of the crystalline material is eliminated by means of a treatment selected from among extraction treatments, thermal treatments at temperatures above 250° C. for a period of time between 2 minutes and 25 hours, and combinations thereof.

12. A process according to claim 7, wherein the structure directing agent is a salt of the (hexamethylene-bis(trimethylammonium) dication.

13. A process according to claim 7, wherein the structure directing agent is the (hexamethylene-bis(trimethylammonium)dihydroxide.

14. A process according to claim 7, wherein the source of the hydroxide M' is selected from between a at least one compensation cation M, the organic structure directing cation and a mixture of the two.

15. A process according to claim 7, wherein seeds of ITQ-24 are added during the first stage, or during the second stage of the process.

16. A process according to claim 7, wherein fluoride ions are added to the synthesis mixture in a molar ratio $F^-/YO_2$ equal to or less than 0.02.

17. A method according to claim 16, wherein the crystalline material contains tetravalent elements in its composition, selected from among Ti, Sn and a mixture of both, and is used as a heterogeneous catalyst in a conversion selected from among an oxidation process of olefins with organic or inorganic peroxides, a Bayer-Villiger type process, and a Meerwein-Pondorf reaction.

18. A method for converting a feed formed from at least one organic compound comprising placing the feed in contact with a catalytically active quantity of a crystalline material obtained according to the method claimed in claim 7.

19. A method for converting a feed formed from at least one organic compound comprising placing the feed in contact with a catalytically active quantity of a crystalline material known as ITQ-24 defined in claim 1, for the conversion of said organic compound.

20. A method according to claim 19, wherein the crystalline material is used combined with hydrogenating-deoxygenating components.

21. A method according to claim 19, wherein the crystalline material is used combined with hydrogenating-deoxygenating components selected from among platinum, palladium, nickel, rhenium, cobalt, tungsten, molybdenum, chromium, vanadium, manganese, iron.

22. A method according to claim 19, wherein the crystalline material contains trivalent elements in its composition and is used as a pelletised component of catalysts in a conversion selected from among a process of catalytic cracking of hydrocarbons, catalytic hydro-cracking of hydrocarbons, reforming of hydrocarbons, alkylation ofaromatics with olefins, esterification, acylation and aniline reaction with formaldehyde.

23. A method according to claim 22, wherein the crystalline material is used in a form selected from among an acid form, exchanged with cations, and in acid form and exchanged with cations.

* * * * *